US011707884B2

(12) United States Patent
Chen et al.

(10) Patent No.: US 11,707,884 B2
(45) Date of Patent: Jul. 25, 2023

(54) SLIDING WINDOW SCREEN FOR REDUCING RESIN REFILLING TIME IN STEREOLITHOGRAPHY

(71) Applicant: UNIVERSITY OF SOUTHERN CALIFORNIA, Los Angeles, CA (US)

(72) Inventors: Yong Chen, Los Angeles, CA (US); Huachao Mao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 488 days.

(21) Appl. No.: 16/317,786

(22) PCT Filed: Jul. 14, 2017

(86) PCT No.: PCT/US2017/042263
§ 371 (c)(1),
(2) Date: Jan. 14, 2019

(87) PCT Pub. No.: WO2018/014000
PCT Pub. Date: Jan. 18, 2018

(65) Prior Publication Data
US 2019/0291342 A1     Sep. 26, 2019

Related U.S. Application Data

(60) Provisional application No. 62/362,433, filed on Jul. 14, 2016.

(51) Int. Cl.
*B29C 64/129* (2017.01)
*B33Y 40/00* (2020.01)
(Continued)

(52) U.S. Cl.
CPC .......... *B29C 64/129* (2017.08); *B29C 64/205* (2017.08); *B29C 64/393* (2017.08);
(Continued)

(58) Field of Classification Search
CPC ........ B29C 64/106; B29C 64/124–135; B29C 64/286
See application file for complete search history.

(56) References Cited

U.S. PATENT DOCUMENTS 4,961,154 A * 10/1990 Pomerantz ............ B29C 64/129
345/419
5,130,064 A * 7/1992 Smalley .................. G06T 17/10
264/401

(Continued)

OTHER PUBLICATIONS

International Search Report and Written Opinion of the International Searching Authority (dated Nov. 3, 2017) for Corresponding International PCT Patent Application No. PCT/US17/42263, filed Jul. 14, 2017.

*Primary Examiner* — Matthew J Daniels
*Assistant Examiner* — Andrew L Swanson
(74) *Attorney, Agent, or Firm* — Snell & Wilmer L.L.P.

(57) ABSTRACT

A sliding window is used in a projection-based stereolithographic process to more quickly deliver uncured resin after each curing pass. The sliding window may be configured in different patterns, and includes features for delivering resin and exposing resin to curing radiation. The window screen divides the stereolithographic building area divided into two portions, a light exposure portion for resin curing and a liquid resin refilling portion. The light exposure portion is used to selectively solidify liquid resin, while the liquid resin refilling portion is used to quickly refill liquid resin in order to build additional layers. During the layer fabrication process, a mask image is projected to the tank; however, the projection light only passes through the light exposure portion of the window screen.

11 Claims, 14 Drawing Sheets

(51) Int. Cl.
- *B29C 64/393* (2017.01)
- *B29C 64/205* (2017.01)
- *B33Y 50/00* (2015.01)
- *B29C 67/00* (2017.01)
- *B33Y 10/00* (2015.01)
- *B33Y 30/00* (2015.01)
- *B33Y 50/02* (2015.01)

(52) U.S. Cl.
CPC .............. *B29C 67/00* (2013.01); *B33Y 40/00* (2014.12); *B33Y 50/00* (2014.12); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2009/0309267 A1* | 12/2009 | Boot | B29C 64/135 264/496 |
| 2013/0292862 A1* | 11/2013 | Joyce | B29C 64/307 264/40.1 |
| 2013/0295212 A1* | 11/2013 | Chen | B29C 64/129 425/150 |
| 2014/0367675 A1 | 12/2014 | Tsukamoto et al. | |
| 2016/0082671 A1 | 3/2016 | Joyce | |
| 2016/0096332 A1 | 4/2016 | Chen et al. | |
| 2016/0136889 A1* | 5/2016 | Rolland | B29C 64/106 264/1.27 |

* cited by examiner

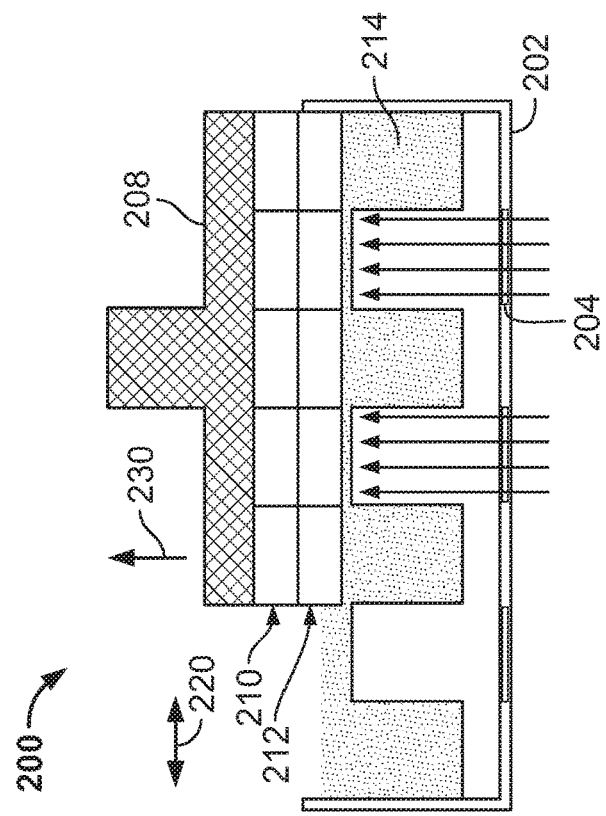
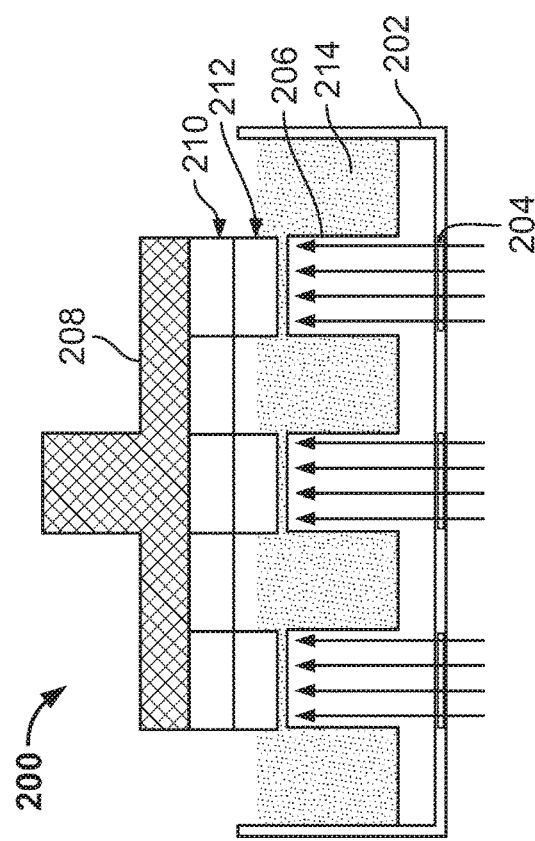

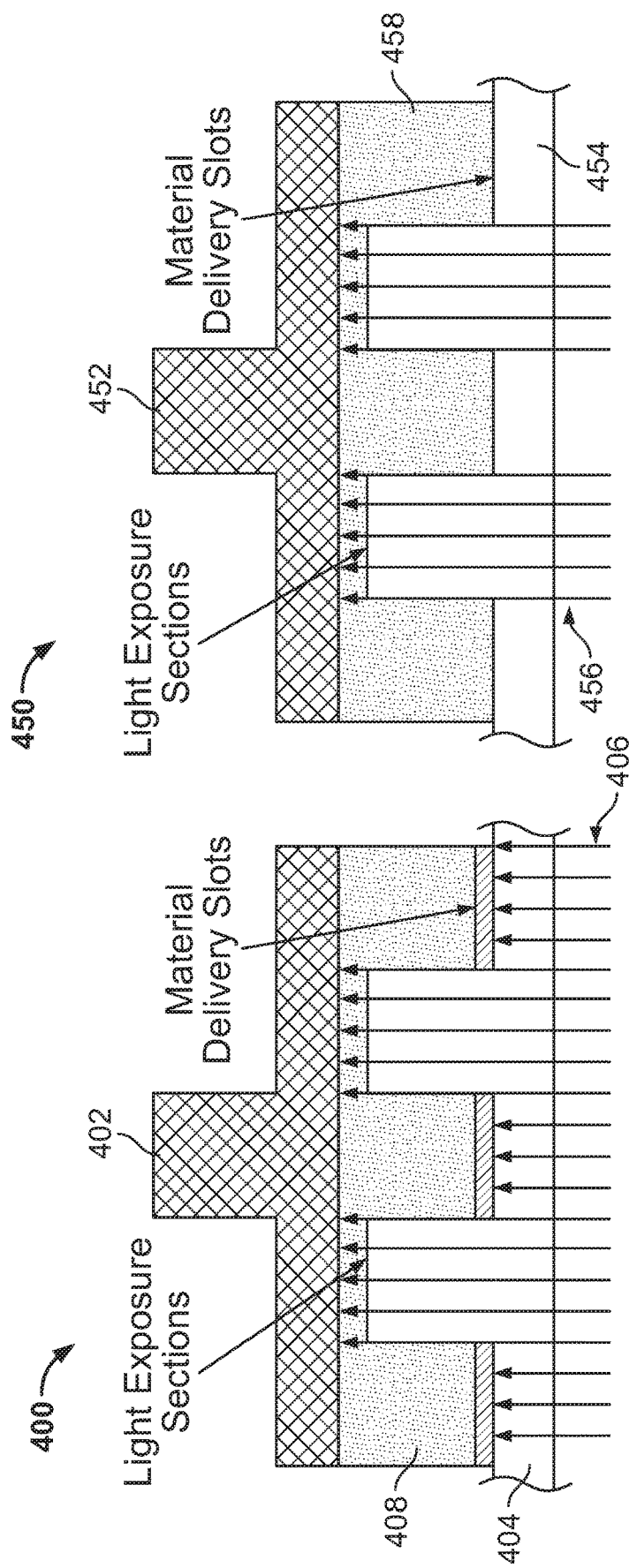

SLIDING WINDOW SCREEN FOR REDUCING RESIN REFILLING TIME IN STEREOLITHOGRAPHY

CROSS-REFERENCE TO RELATED APPLICATION

This application claims benefit and priority of U.S. provisional patent application Ser. No. 62/362,433 filed Jul. 14, 2016, which is incorporated herein in its entirety by reference.

FIELD

The present disclosure relates to methods and apparatus for additive manufacturing, and in particular, a three dimensional (3D) printing approach using projection-based stereolithography.

BACKGROUND

Material refilling is a critical issue in stereolithography (SL), including both laser-based SL and projection based SL. Fabrication speed is slowed by the extra time required for refilling liquid resin. Although several methods have been developed to reduce this extra refilling time, they are designed to be effective for shapes that have small building areas. The building speed will be significantly reduced when the shape under construction has large cross-section areas, because liquid refilling for large building areas is much more complex than for small building areas.

In one stereolithography process (Hull, 1986) a liquid photo sensitive polymer is solidified by absorbing a certain amount of photons. In each build layer, the photo sensitive polymer is made to cover previously solidified layers, sometimes referred to as "refilling." By successively solidifying the liquid resin and refilling, a three dimensional object is fabricated layer-by-layer. The SL process can be divided into three main steps: 1) resin refilling, 2) light exposure, and 3) separating newly cured layer that is attached to the previous layers from the resin interlace. Due to inefficient material refilling and separation processes, most conventional SL processes have slow fabrication speed, for example, less than about 5 µm/s in the building direction.

Several prior approaches have been taken with refilling. These methods can be classed as "sequential" or "simultaneous." In the sequential methods, the material is refilled by a relative motion between a tank containing the resin, or a recoating blade, and a platform, sometimes called a "carrier." The carrier carries the newly cured part after one layer is selectively solidified. Due to the viscosity of uncured resin, the time required for the uncured resin to flow from an outer area into the center of the building area slows down the build process.

Conventional projection-based, sequential SL also adds an extra move: an up-and-down motion of the carrier to refill liquid resin between each cure cycle. The time required for the up-and-down motion may cause additional delay. To speed up the material refilling process, Pan et al. (Pan, Zhou, and Chen, 2012) disclose refilling liquid resin by sliding the tank horizontally over the carrier, allowing the platform to reach the adjacent fresh material more quickly. However, all these sequential methods require a long resin refilling time, which slows down the fabrication speed of the projection-based SL process.

Recently, a simultaneous method to refill the resin together with the light exposure has been proposed (John, et al., 2015). In John's method, a liquid dead zone is formed where the resin curing is inhibited by oxygen and this dead zone acts as conduits to refill the resin from the outer to the center of building area. However, the dead zone has limited height (~50 micron) due to process stability. Such a height is still too shallow for liquid resin to quickly refill into a large building area, such as for example over about 50×50 mm square (250 mm$^2$) or larger. A related simultaneous refilling method also proposed by John opens an array of conduits in the carrier and internal tubes in the targeted part. However, use of this second method may require redesign of the parts' geometry, which is not desirable for users in most cases.

The inventors hereof disclosed a simultaneous refilling method in U.S. Pat. No. 9,120,270 issued on Sep. 1, 2015, in which a moving zone is formed to refill liquid resin by continuously rotating the tank. This "moving zone" method can successfully improve the refilling speed while separating newly cured layers from the resin interface. However, for a very large building area, the method will still take a relatively long time due to the long moving distance and the limitation on the moving speed.

It would be desirable, therefore, to provide a method and apparatus for refilling in SL, that overcomes these and other limitations of the prior art.

SUMMARY

This summary and the following detailed description should be interpreted as complementary parts of an integrated disclosure, which parts may include redundant subject matter and/or supplemental subject matter.

The present disclosure introduces a novel SL process using a sliding window screen that significantly reduces the required moving distance for refilling liquid resin regardless of the shape and size of a given 3D model, relative to the prior moving zone method referred to above. Simply put, a window screen is an apparatus that can simultaneously deliver light and refill liquid resin into a very large building area. Thus the window screen enables an SL process to fabricate a large 3D object with faster building speed than prior approaches.

In an aspect of the disclosure, a system for additive manufacturing of an object in three dimensions (consisting of an X dimension, a Y dimension, and a Z dimension) includes various elements. The elements include a tank configured to contain a liquid resin, a window screen configured to simultaneously deliver light and refill liquid resin into a build area in the tank, and a build platform configured to be located within the tank for at least an initial portion of building the object. One or more translation/rotation stages are operatively coupled to the build platform, the window screen and/or the tank. The one or more translation/rotation stages move the tank and/or the build platform in the Z dimension, and the build platform and/or the window screen in the X dimension, the Y dimension, by translation, rotation, or a combination of translation and rotation.

As used herein, the 'Z' direction or dimension refers to the build direction, and is usually perpendicular to the plane of the platform on which the part is built the "build plane." The build plane is defined by the 'X' and 'Y' dimensions. As used herein in connection with the accompanying figures, the 'X' and 'Z' directions are coplanar with the plane of the figure on the page, while the 'Y' direction is perpendicular to the page.

The system may further include a light projection device configured to emit light through the window and into the tank to cure the liquid resin. Transparent areas of the window screen in conjunction with the projection mask determine which portions of the liquid resin are cured. The window may be moved in conjunction with varying the projection mask to deliver uncured resin and cure resin only in desired areas. The window screen includes a pattern of slots for delivering resin and windows for light transmission. The pattern may be designed to optimize refilling and curing of liquid resin for the article being manufactured.

The system may further include a computer control system including at least one hardware processor and a storage device coupled with the hardware processor. The computer control system may be coupled with the one or more translation stages to control movement of the tank, the build platform and/or the window screen. The computer control system may be coupled to the light projection device to control emission of the light, and to the storage device. The storage device or other computer memory may hold an encoded program, including instructions that when executed by the at least one processor, cause the computer control system to control the light projection device to emit the light through the window screen into the tank to cure the liquid resin to form a first portion of the object in a current layer. The instructions may further includes instructions for controlling the one or more translation stages to move the build platform and/or the window screen in the X dimension, the Y dimension, or both, including by rotation. The instructions may further includes instructions for controlling the light projection device to emit the light through the window screen into the tank to cure the liquid resin to form a second portion of the object in the current layer. The instructions may further includes instructions for controlling the one or more translation stages to move the tank and/or the build platform in the Z dimension for a curing a next layer of the object.

In an aspect of the system, the window screen is integral with the tank, and the one or more translation stages move the window screen by moving the tank in the X dimension, the Y dimension, or both, including by rotation. The window screen may be, or may include, a mesh window. The window screen may be, or may include, a parallel pattern of opaque slots for refilling liquid resin and transparent slots for exposing projection light to selectively solidify liquid resin. In an alternative, the window screen may be, or may include, a grid pattern of opaque areas for refilling liquid resin and transparent areas for exposing projection light to selectively solidify liquid resin. In another alternative, the window screen may be, or may include, a radial pattern of opaque areas for refilling liquid resin and transparent areas for exposing projection light to selectively solidify liquid resin. In another alternative, the window screen may be, or may include, a branch pattern of opaque areas for refilling liquid resin and transparent areas for exposing projection light to selectively solidify liquid resin.

In another aspect, a method for stereolithography for additive manufacturing using a sliding window screen may include fabricating an article from liquid resin by layer-based stereolithography, including performing certain operations in forming each layer. The certain operations may include simultaneously photopolymerizing and resin refilling a portion of the layer by projecting a mask through a window screen having distinct resin curing and refilling regions, sliding the window screen to a different portion of the layer; and repeating the simultaneous photopolymerizing and resin refilling for distinct portions of the layer until fabrication of the layer is completed.

The method may further include determining one or more projection masks for each layer based in part on a pattern in which the distinct resin curing and refilling regions of the sliding window are arranged. In an aspect, for example, the distinct resin curing and refilling regions of the window screen are arranged in a pattern selected from: parallel, gridded, radial, or branched. In another aspect, the projection mask may be configured with black pixels correlated to all refilling regions of the window screen, and light emitting pixels correlated one or more resin curing regions of the window screen. In some embodiments, the window screen is opaque in the refilling regions. In others, the resin refilling regions are transparent. The method may include determining one or more projection masks for each layer based in part on whether the window screen is opaque in the refilling regions. In an aspect, the repeating step is performed only once for each layer.

The method may further include, for example, setting a layer thickness based on the relation $h=\eta Cd$, wherein h is the layer thickness, $\eta$ is an overlap ratio between layers, and Cd is a light penetration depth. Setting other parameters may be performed as described in the detailed description.

The method may include separating the window screen from the portion of the layer at least in part by exerting a separation force in a direction perpendicular to a plane of sliding motion of the window screen. The method may include other operations and aspects, as described in the detailed description.

An apparatus for projection-based stereolithography may include least one processor coupled to a memory, a motor controller, and a light source capable of emitting light in a masked pattern. The memory holds program instructions that when executed by the processor causes the apparatus to perform the operations of the method described above, and in the detailed description.

A window screen for additive manufacturing by projection-based stereolithography may include one or more of resin curing regions comprising raised transparent windows aligned in a plane, and one or more resin refilling regions arranged around the resin curing regions. The resin refilling regions may be, or may include slots configured for enabling resin to flow to a layer under cur while light is projected through the resin curing regions. A working plane of the window screen may consist essentially of the resin curing regions and resin refilling regions. In some embodiments, the resin refilling regions are opaque to light from the projection mask, acting as light blockers to prevent curing. In other embodiments, the resin refilling regions are transparent or translucent, and the light in the refilling region is blocked by a projection mask. The window screen may include a wall around a periphery of the window screen for retaining liquid resin. In an aspect, the resin curing and refilling regions of the window screen may be equal in area. In another aspect, the resin curing and refilling regions of the window screen are arranged in a pattern selected from: parallel, gridded, radial, or branched. Further details of the window screen may be as described in the detailed description below.

To the accomplishment of the foregoing and related ends, one or more examples comprise the features hereinafter particularly pointed out in the claims and fully described in the detailed description following the brief description of the drawings.

BRIEF DESCRIPTION OF THE DRAWINGS

The features, nature, and advantages of the present disclosure will become more apparent from the detailed description set forth below when taken in conjunction with the drawings, in which like element numerals are used to indicate like elements.

FIGS. 2A-B are side schematic diagrams in a time sequence, illustrating operation of the sliding window screen in a projection-based SL process.

FIGS. 4A-B are side schematic diagrams, illustrating a comparison between use of opaque blocking walls in the sliding window and blocking masks in a light source.

DETAILED DESCRIPTION

Figure 1:
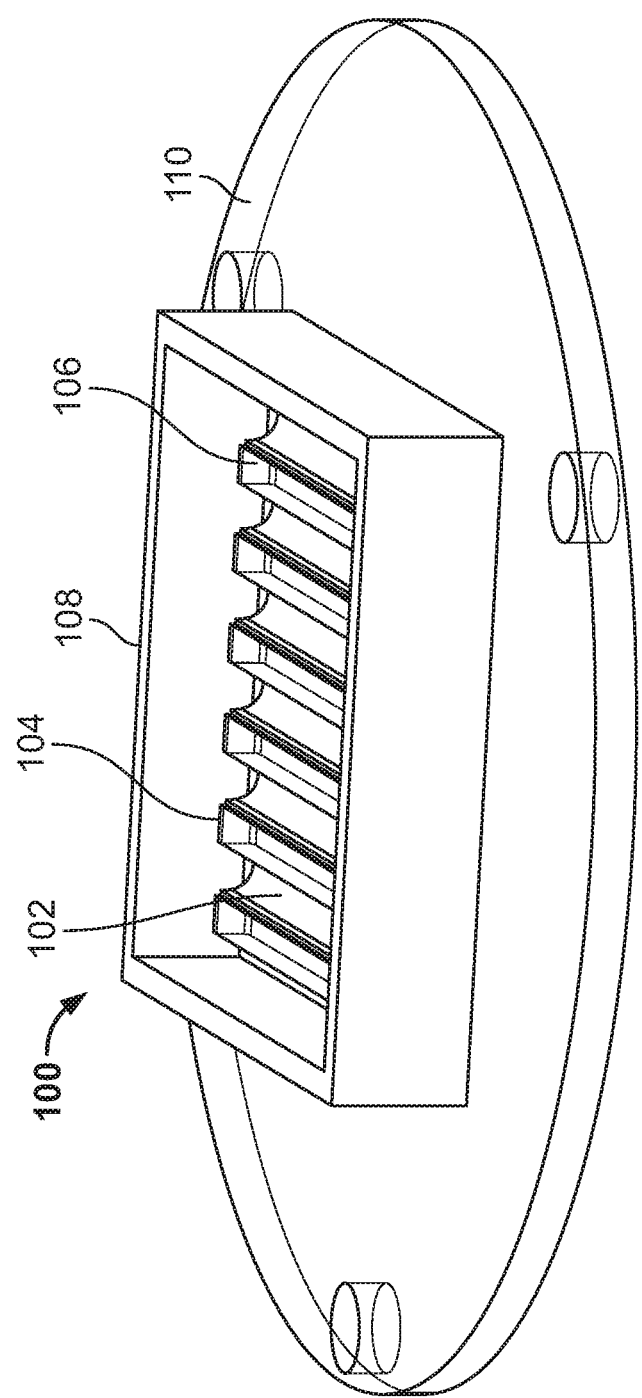
FIG. 1 is a perspective view of a sliding window screen for use in a projection-based SL process, arranged in a parallel pattern.

Referring to FIG. 1, an apparatus for stereolithography may include a platform 110 positioned relative to a sliding window screen 100 for use in a projection-based SL process. To solve the material refilling issue in SL, the incorporated window screen 100 is configured to minimize the sliding distance that is required for every position of a layer to access liquid resin during the fabrication process. Unlike the tank used in the conventional SL process, the tank in our process is defined by the wall 108 and incorporates the window screen 100. The window screen 100 includes both opaque slots 102 (one of six indicated in FIG. 1, as examples) for refilling liquid resin, and transparent slots 106 (one of six indicated) sealed by a transparent material and surrounded around a periphery thereof by a blocking wall 104 (one of six indicated). The transparent slots (e.g., slot 106) are provided for exposing projected light to selectively solidify liquid resin.

Referring to FIGS. 2A and 2B, operation of the sliding window screen in an apparatus or system 200 for projection-based SL process is illustrated at different times of the process. In both FIGS. 2A and 2B, a tank wall 202 encloses uncured resin 214 and includes in its lower surface an array or other arrangement of transparent windows 204 (one of three indicated for illustrative purposes) surrounded by opaque areas making up a remainder of the tank wall 202. In other words, a working surface of the apparatus 200 is divided into transparent and opaque areas divided by boundary walls according to some pattern. The pattern may be selected to minimize refilling time and/or total fabrication time. At any given moment, due to the use of the window screen, the building area on the platform 208 is divided into two portions, a light exposure portion (also called a resin curing region) made up of the windows 204, and a liquid resin refilling portion (also called a resin refilling region) recessed in the Z direction relative to the resin curing portion, thereby allowing resin to flow to the surface of the part under fabrication. The light exposure portion is used to selectively solidify liquid resin, while the liquid resin refilling portion is used to quickly refill liquid resin in order to build additional layers, e.g., second layer 212. In the illustrated example 200, the platform 208 moves up in the direction of the vertical arrow 230, while the sliding window screen moves back-and-forth as indicated by the horizontal double-headed arrow 220.

During the layer fabrication process, a mask image is projected to the tank; however, the projection light (indicated by the vertical rising arrows) can only pass through the light exposure portion 204 of the window screen. FIG. 2A shows an SL process building a second layer 212 on top of a first layer 210 at a first (earlier) point in time. Uncured resin 214 flows to portions of the layer 212 that are not being cured while the exposure is made. After liquid resin in the portion receiving light is selectively cured, the window screen including the opaque wall 202 and transparent windows 204 is moved in an XY plane for a small distance that is determined by the pattern of the exposure and refilling portions in the window screen, as shown in FIG. 2B at a second (later) time. Consequently, the portion of the second layer 212 that has refilled liquid resin is positioned over the windows 204, while the previously cured portion of the layer 212 that was cured at the time shown in FIG. 2A is positioned over the liquid resin refilling portion to expose to a sufficient supply of liquid resin. Although not shown in FIGS. 2A and 2B, a small overlapping region exists between the second and first exposures.

After projecting two mask images related to a given cross section of a 3D model, the whole layer 212 is formed. The platform that carries the previously cured layers moves up (in the Z axis) the distance of a layer thickness. At the same time, the window screen is moved (in the X axis) back to its original position. Thus, the building process can be repeated until all the layers of the 3D object are constructed.

Figures 3A, 3B:
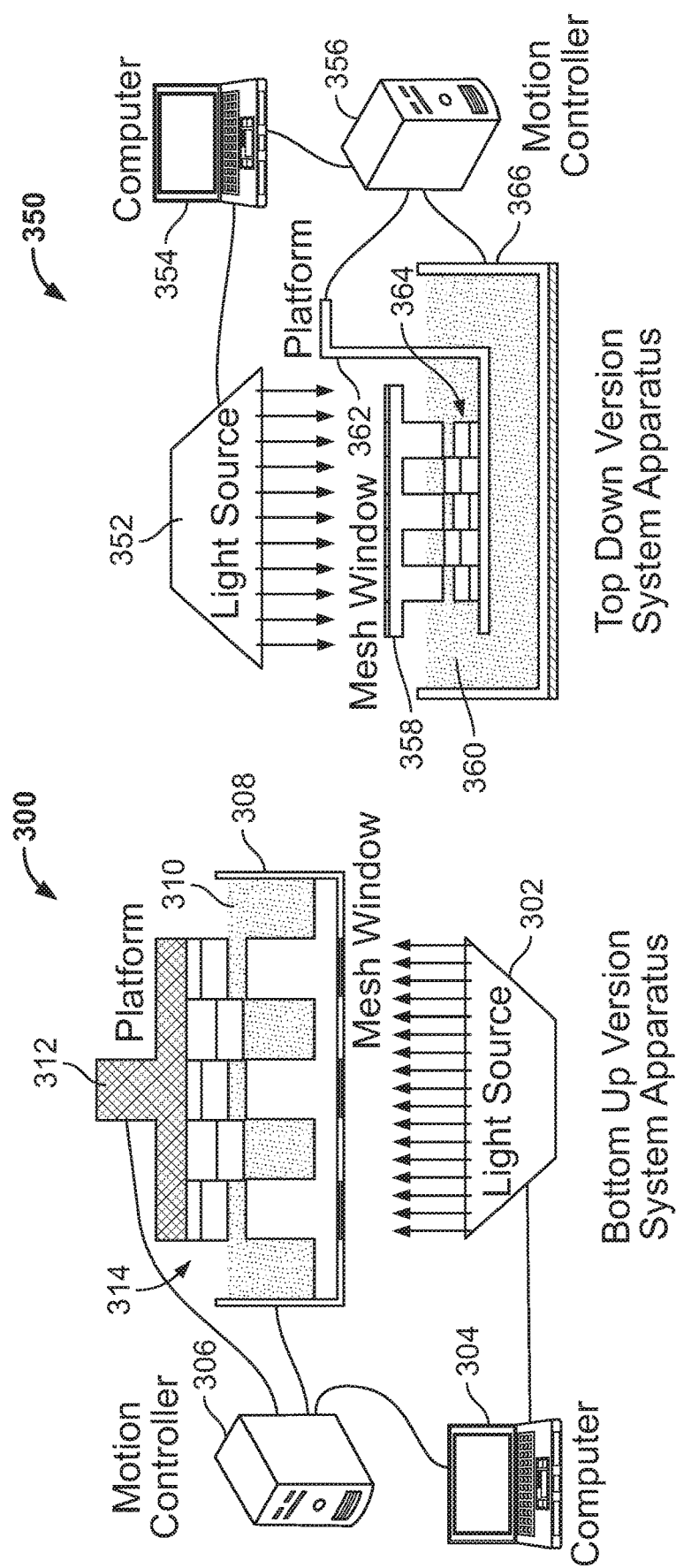
FIGS. 3A-B are system diagrams illustrating bottom up and top down embodiments, respectively, of systems for a projection-based SL process using a sliding window screen.

FIGS. 3A-B illustrate bottom up and top down embodiments, respectively, of systems for a projection-based SL process using a sliding window screen. FIG. 3A illustrates a bottom up embodiment, in which the projection light 302 is shown upwards and the platform 312 also moves upwards during fabrication. In the bottom up SL embodiment, an SL apparatus 300 may include a computer 304 including a processor, memory, and other components for motion and projection control, a motion controller 306, the platform 312, a window screen 308 (also called a mesh window), liquid photocurable material 310, and a light source 302. The platform 312 may be, or may include, a plate or similar support component that is used to carry the built part 314. The motion controller is coupled to the platform 312 via a drive train or the like, and is used to control the motion of the platform 312 in the Z axis and the window screen 308 in the X and/or Y axes. The motion controller 306 may be coupled to the computer 304, which provides higher-level control signals to the motion controller coordinated with control of the light source 302 also coupled to the computer 304. The light source 302 is controlled by the computer 304 to project mask images that selectively solidify the liquid resin 310 and build up the layers 314 forming the built part. The computer 304 is programmed via encoded instructions in a non-transitory computer-readable medium to synchronize the masks and operation of the light source 302 with movements of the platform 312 and window screen 308 controlled by the motion controller. It should be apparent that the operation of the light source and motion controller will depend on both the physical configuration of the window screen 308 and the geometry of the part to be manufactured.

FIG. 3B shows a related top down embodiment including an apparatus 350, including a computer 354 for motion and projection control, a motion controller 356, the platform 362, a window screen 358 (also called a mesh window), liquid photocurable material 360, and a light source 352. Configuration of the top down apparatus 350 is analogous to the bottom up apparatus 300, with adjustments for the top-mounted light source 352 and platform 362 that moves downwards in the tank 366 as the article under manufacture is built up from the layers 364.

A window screen is used in the SL system to achieve both light exposure and liquid resin delivery simultaneously. Consequently, a window screen contains three key components: exposure sections, material delivery slots, and light blocking walls unless specially configured projection masks are used in the light source instead. Exposure sections are transparent openings in the window screen that allows light to pass in order to cure liquid resin in the section. Material delivery slots serve to refill liquid resin for the next projection image exposure. Blocking walls protect the material in the material delivery slots from being cured by the projection light, but may be omitted in some embodiments as explained below. FIG. 4A shows an embodiment 400 using opaque blocking walls at the bottom of the material delivery slots in the window screen 404 to block unmasked light 406 from reaching the uncured resin 408 in the material delivery slots. The light 406 passes only through the light exposure sections of the window screen 404 to cure resin between the platform 402 and light-transmissive windows of the light exposure sections, FIG. 4B shows an embodiment 450 without opaque blocking walls at the bottom of the material delivery slots in the window screen 454. Instead, the light 456 is masked in regions corresponding to the material delivery slots of the window screen 454 (e.g., by setting source pixels to black in those regions), thus preserving the liquid resin 458 in the material delivery slots uncured. The light 406 passes only through the light exposure sections of the window screen 404 to cure resin between the platform 452 and light-transmissive windows of the light exposure sections. The window screen 454 may be formed entirely of a light transmissive material without need for configuring the screen into opaque and transmissive areas, provided appropriate light masks are used at the light source or between the source and the window screen 454. Notice that at any time, only the exposure sections of a window screen can solidify resin to form the part, in both embodiments 400 and 450.

Therefore, to fabricate a whole layer, a window screen should move repeatedly in the X axis, Y axis, or X-Y plane to cover a whole layer uniformly or wherever it is needed to cure resin.

Figure 5A:
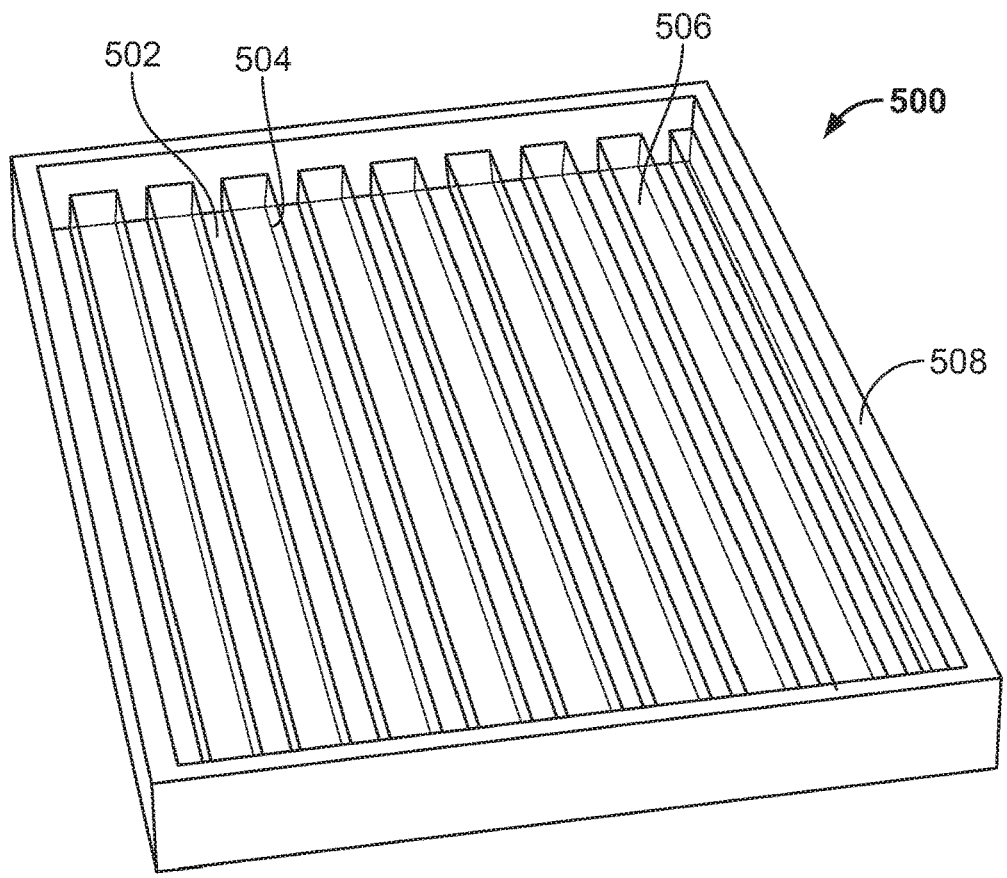
FIGS. 5A-D are perspective views each showing a different type of pattern for configuring a sliding window screen.
Figure 5B:
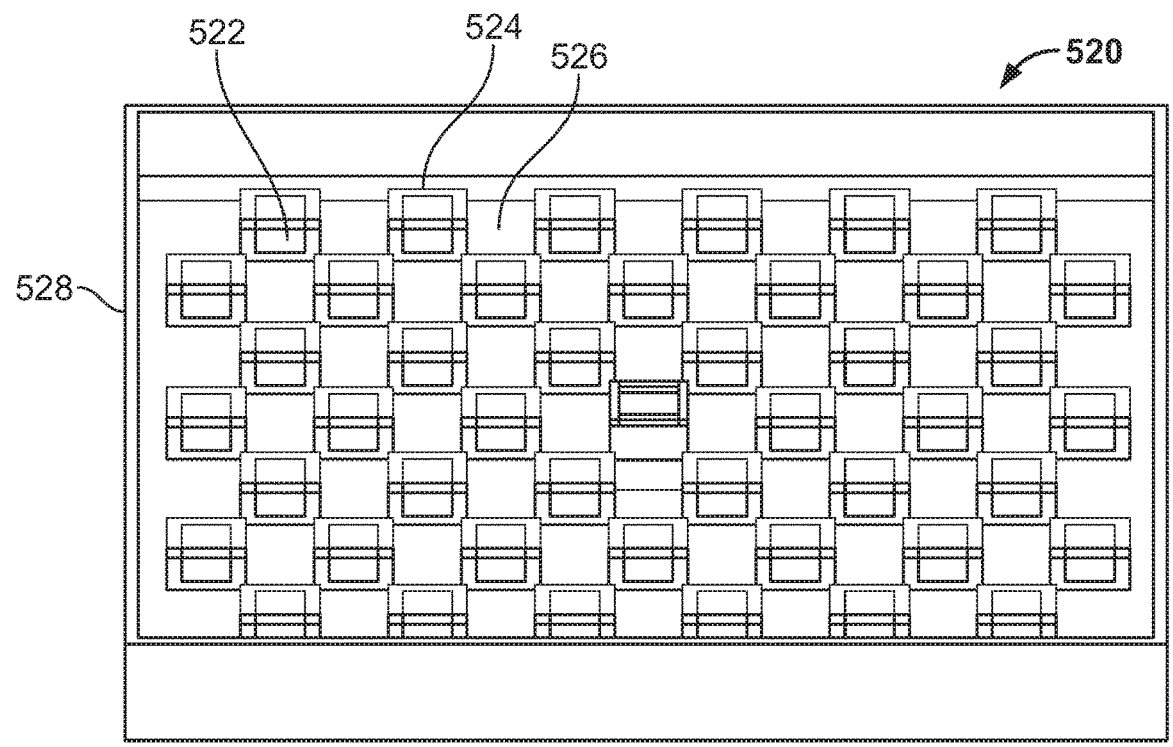
Figure 5C:
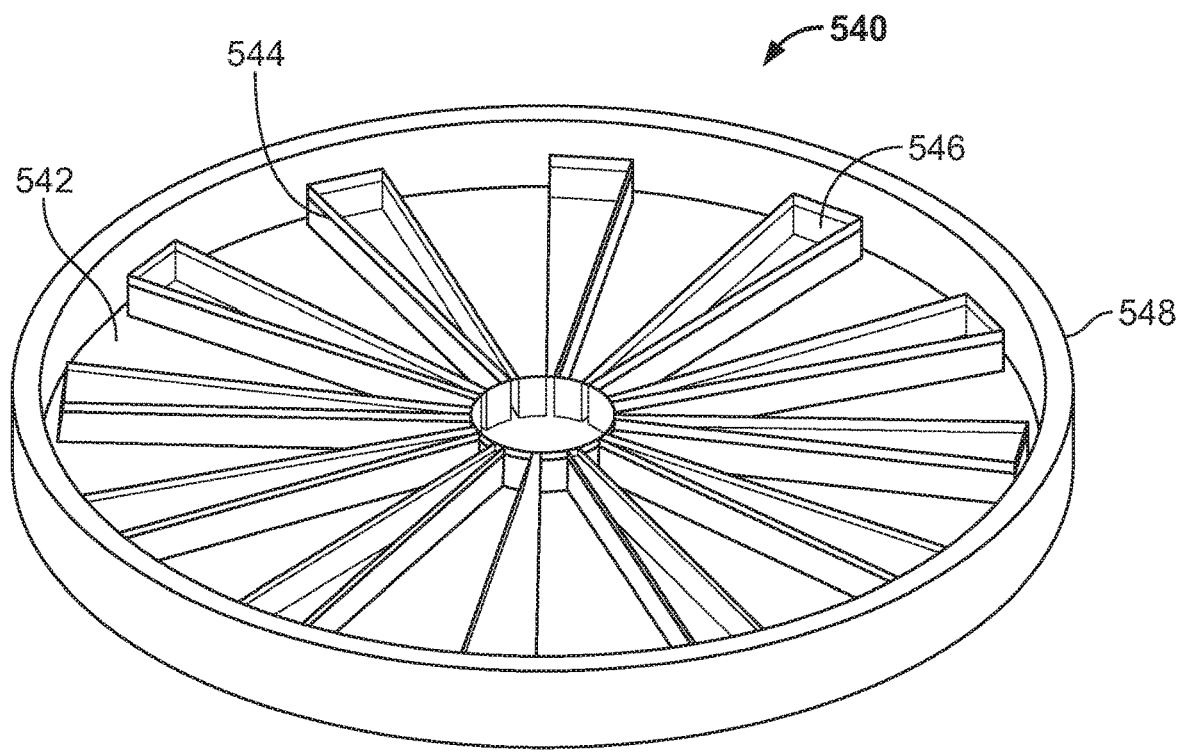
Figure 5D:
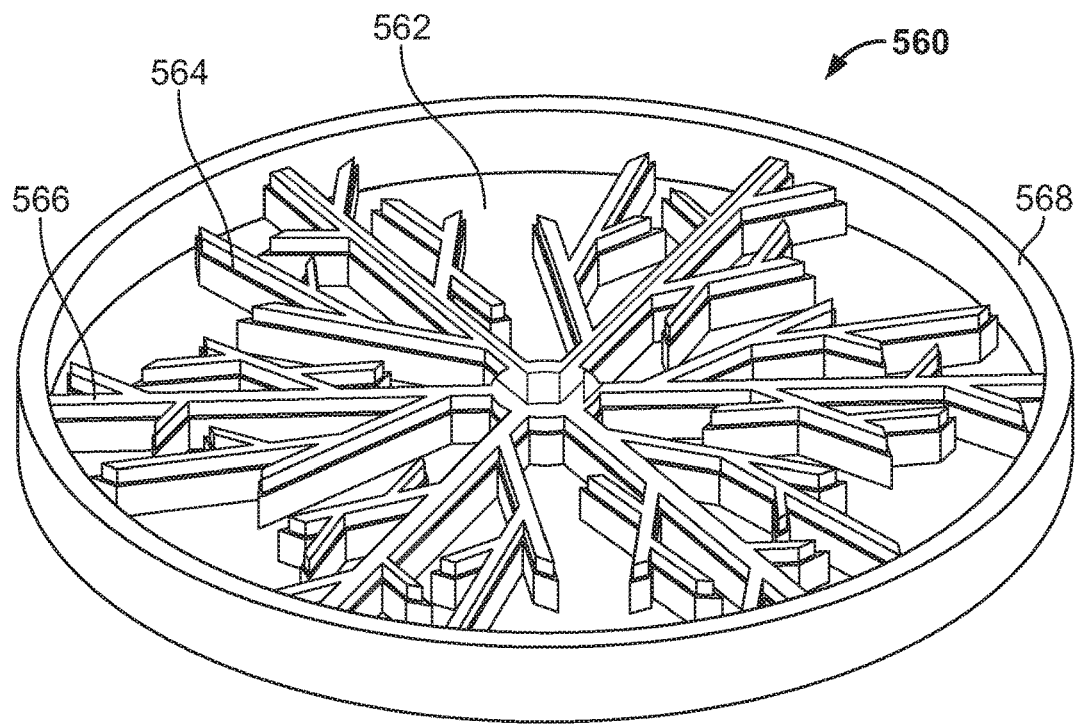

Window screen pattern and sliding motion are critical elements of the present window-screen-based SL process. Window screen pattern means the shape and arrangement of the liquid resin refilling slots. FIGS. 5A-D each show a different type of pattern for configuring a sliding window screen. FIG. 5A shows a window screen 500 configured in a parallel pattern, wherein transmissive regions 506 are interspersed with material delivery regions (slots) 502 arranged in parallel bars separated by parallel sidewalls 504 and all surrounded by tank walls 508. FIG. 5B shows a window screen 520 configured in a grid pattern, wherein transmissive regions 522 are interspersed with material delivery regions 526 arranged in a grid separated by sidewalls 524 and all surrounded by surrounding walls 528. FIG. 5C shows a window screen 540 configured in a radial pattern, wherein transmissive regions 546 are interspersed with material delivery regions 542 arranged in a radial pattern separated by sidewalls 544, with all surrounded by walls 548. FIG. 5D shows a window screen 560 configured in a branching pattern, wherein transmissive regions 566 are interspersed with material delivery regions 562 arranged in a grid separated by sidewalls 564, with all surrounded by surrounding walls 568. These patterns are merely examples, and other patterns for window screens may also be useful.

Figure 6A:
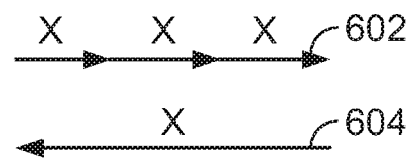
FIGS. 6A-C are schematic diagrams each illustrating a different motion cycle for a sliding window screen used in a projection-based SL process.
Figure 6B:
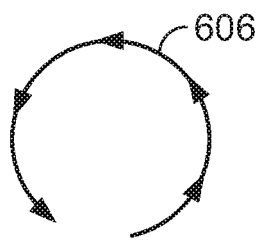
Figure 6C:
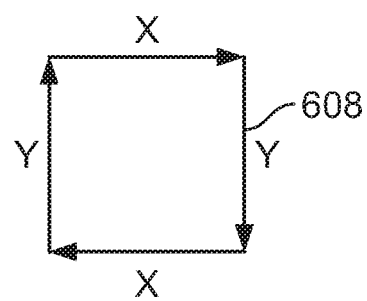

Corresponding to the pattern design, the window screen needs to move in such a way that the remaining exposure portion of the window screen will cover the whole building area. There are at least three useful window screen movements as shown in FIGS. 6A-C: a back and forth movement 602, 604 shown in FIG. 6A, with unequal increments in the forward direction 602 and reverse direction 604: rotation 606 as shown in FIG. 6B; and a rectangular or other polygonal cycle 608 as shown in FIG. 6C. For example, the parallel pattern as shown in FIG. 5A will use the sliding motion of back and forth shown in FIG. 6A. The radial and branch patterns as shown in FIGS. 5C and 5D will use the rotation motion shown in FIG. 6B. The grid pattern as shown in FIG. 5B will use the cycles pattern illustrated by FIG. 6C. In the following parts of the detailed description, examples are given of the back and forth motion using a window screen based on the parallel pattern, and rotation motion using a window screen based on the radial pattern.

Additional window screen using a combination of the motions and patterns can also be used as long as the window screen satisfies the following requirements: 1) the liquid resin refilling portion is blocked from the light source, 2) the light exposure portion is transparent and non-stick, and 3) the refilling slot should be deep (>1 mm) such that the resin can be effectively delivered to any position of the building area without slowing the build process.

Figure 7:
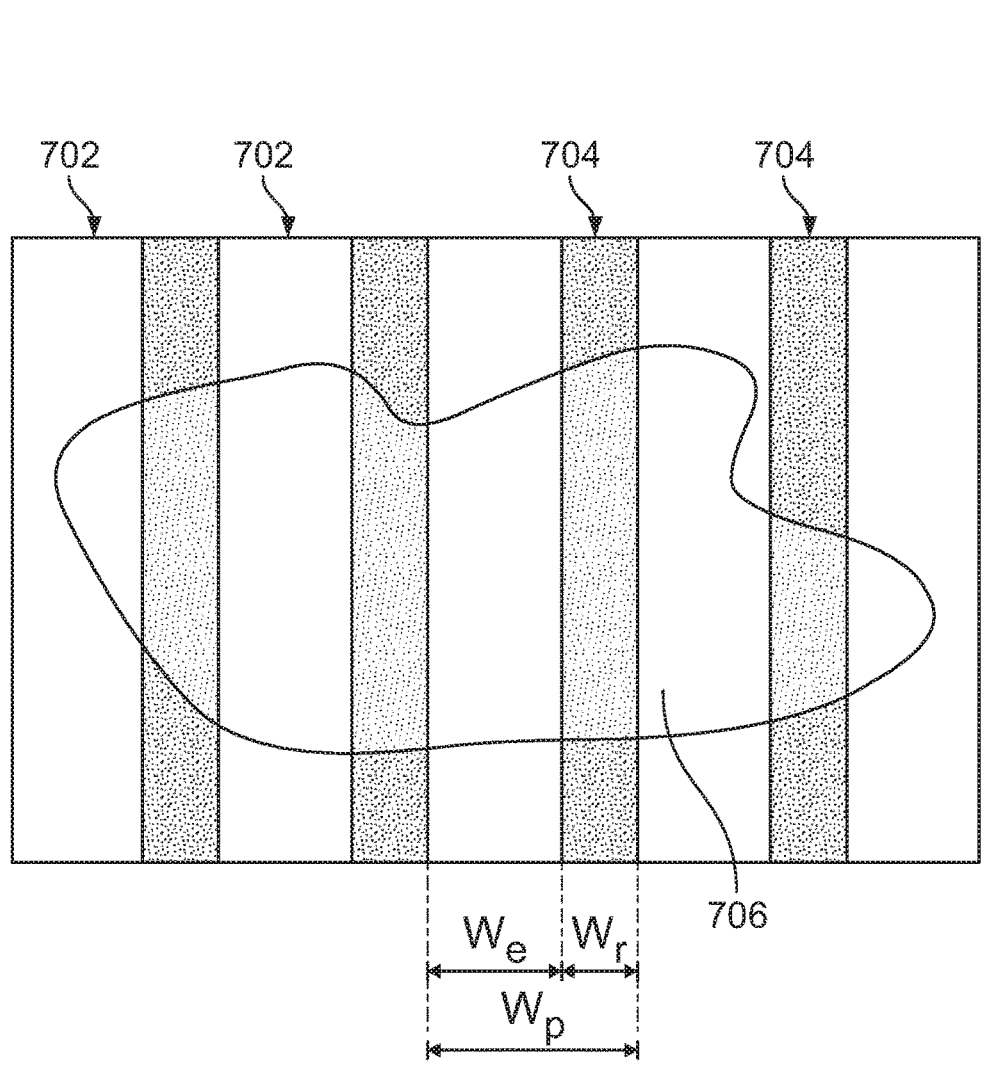
FIG. 7 is a schematic top view illustrating aspects of refilling in a projection-based SL process using a sliding window screen.

The apparatus and systems as described above may be used to perform a novel method of refilling liquid resin in an SL process. Referring to FIG. 7, the window screen 700 divides the window into two mutually exclusive portions, (i) an exposure portion 702 for selectively solidifying liquid resin using projection light, and (ii) a liquid resin refilling portion 704 for recoating liquid resin to previously cured layers. With such an apparatus, an entire large build area (e.g., >250 mm$^2$) may be refilled with liquid resin by moving the window screen for a much smaller distance. For example, when using a parallel configured window 700, the smaller distance may be as small as the sum of the refilling and exposure portions (e.g., $W_e + W_r = W_p$). Hence the building process including both light exposure and resin recoating can be accomplished quickly.

Using the window screen with desired pattern and motion, the material refilling in the present system is a force refilling method rather than the slow self-refilling in the conventional SL process and CLIP process. The material refilling time in the current process may be represented by:

$$t_{force-refill} = \frac{W_p/2}{v_m}$$

where $v_m$ is the moving speed of the window screen, and $W_p$ is the pitch of window screen, which is a fixed value (e.g. 5 mm to 20 mm in our experiment). Such a moving distance is fixed regardless the shape or size of given 3D models, and can be much smaller than the size of a building object (e.g. 200 mm). In comparison, the liquid resin refilling in the conventional SL and CLIP processes is driven by the pressure difference. The required refilling time is determined as (John, et al., 2015):

$$t_{self-refill} \propto \frac{\mu d^2}{P h_i^2}$$

where $\mu$ is the material viscosity, d is the feature's diameter, P is the pressure, and $h_i$ is the height of inhibition zone. This equation indicates that the fabrication speed is largely mitigated by the building feature's diameter d and material viscosity.

Compared to the pressure-based self-refilling, the force-refilling used in the present process is only governed by the window screen, and is not dependent on the liquid resin or the given 3D models. Hence, the present material refilling method has advantages over prior SL processes. That is, first, the refilling time is independent of the shapes and sizes of input 3D models, because the material is refilled by the motion of window screen. The refilling time is only limited by the sliding speed of the window screen. Second, the refilling time is not subject to the material's viscosity, which means the present process can fabricate photocurable materials that may have a much larger range of viscosity.

Once liquid resin is refilled, the window screen moves to a position where the controlled projection light can be exposed onto the areas that have recoated resin. The present technology is built on the conventional projection-based SL processes, in which input 3D models are sliced into many 2D layers, and the correspondingly prepared mask images are projected to selectively solidify liquid resin for building each layer. For the present process, a similar slicing procedure may be used. That is, given an input 3D model, it may be sliced into a sequence of mask images. And for each mask image, a pattern may be applied based on the window screen's position such that only the exposure portion of the window screen will have light exposure to solidify liquid resin. That is, all the pixels that fall into the material delivery slots should be replaced with black pixels (i.e. no light exposure for such portions).

Figure 8:
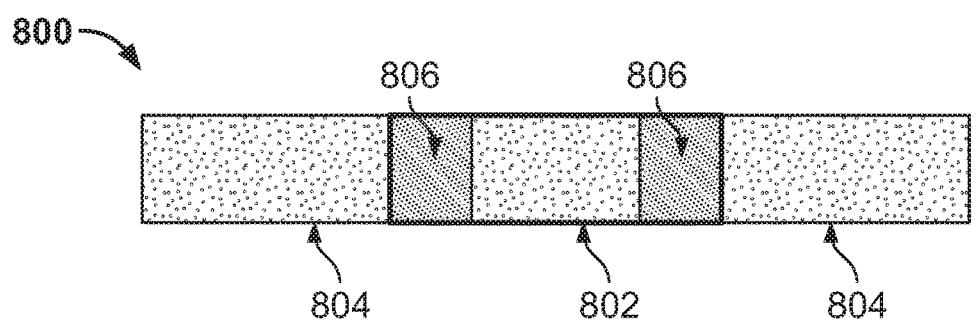
FIG. 8 is a schematic side view illustrating aspects of overlap in a projection-based SL process using a sliding window screen.

Overlapping areas between two or more light exposures of a layer are designed to enhance the mechanical strength of the built layers. As shown in FIG. 8, suppose the whole layer 800 is covered by two light exposures 804, 802 using the parallel pattern (refer to FIG. 5A). The solidified portion by light exposure 802 needs to have overlapping areas 806 with the neighboring solidified portions by light exposure 804. To enhance the bonding between different light exposure area, reduced energy can be used for in each exposure. For example, only 50% energy is used in the overlapping areas while 100% energy is used in other areas. In some embodiment, the overlap areas could be covered by more than 2 exposures. In such cases the light exposure can be set as 100/r % energy, where r is the total number of light exposures. Generally speaking, light exposure should be configured to expose the whole area to be cured with uniform light energy, Fabrication Speed Analysis: In the projection-based SL processes, the fabrication speed is bounded by two factors: 1) the liquid resin curing speed, and 2) the liquid resin refilling speed. In this disclosed process, if neglecting the resin refilling time, the resin curing speed is $$v_{cure} = \frac{h}{t_{cure}} = \frac{\phi}{E_c} h e^{-\frac{h}{\eta D_p}} \le e^{-1} \frac{\eta \phi D_p}{E_c},$$

where $D_p$ is the light penetration depth, $\eta$ is overlapping ratio between two layers (e.g., 0.7 may be set in the present process), and the equality holds when the layer thickness $h = \eta D_p$. This equation indicates that the building speed is proportional to the input energy power $\phi$, building resolution h and material critical dosage $E_c$. Similar results can be found in "continuous liquid interface production" method (John, et al., 2015).

However, another speed bound is the material refilling speed. In the conventional SL processes, the fabricated height is h and material refilling time $t_{self-refill}$. Hence, the bound of the material self-refilling speed in the conventional SL processes is $$v_{self-refill} = \frac{h}{t_{self-refill}} \propto \frac{P h^3}{\mu d^2}.$$

This equation indicates that the refilling speed in conventional SL process is inversely proportional to the square of the fabrication features' diameter d, multiplied by the viscosity $\mu$ of liquid resin. And limited by this bound, any SL process relying on material self-refilling is subjected to the feature's diameter d, and material's viscosity $\mu$.

In the present technology, however, the material refilling speed is $$v_{force-refill} = \frac{h}{t_{force-refill}} = \frac{2h v_m}{w_p},$$

which is usually larger than the curing speed. For each layer, the present process needs two exposures to cure the whole layer. Thus the total time for each layer is the summation of two exposure times and two window screen transition times. Hence, the building speed in the present process is $$v_{build} = \frac{h}{2t_{cure} + 2t_{force-refill}} = \frac{1}{2} \frac{1}{\frac{1}{v_{cure}} + \frac{1}{v_{force-refill}}}.$$

In some embodiments, the speed of forced refill may be greater than the speed of cure. In such cases, part accumulation speed lies in the range of $$0.25v_{cure} \leq v_{build} \leq 0.5v_{cure}$$

That is, $$0.25e^{-1}\frac{\eta \phi D_p}{E_c} \leq v_{build} \leq 0.5e^{-1}\frac{\eta \phi D_p}{E_c}.$$

The part accumulation in the present process has better material refilling performance, which can achieve a fast speed for large area fabrication.

Figure 9:
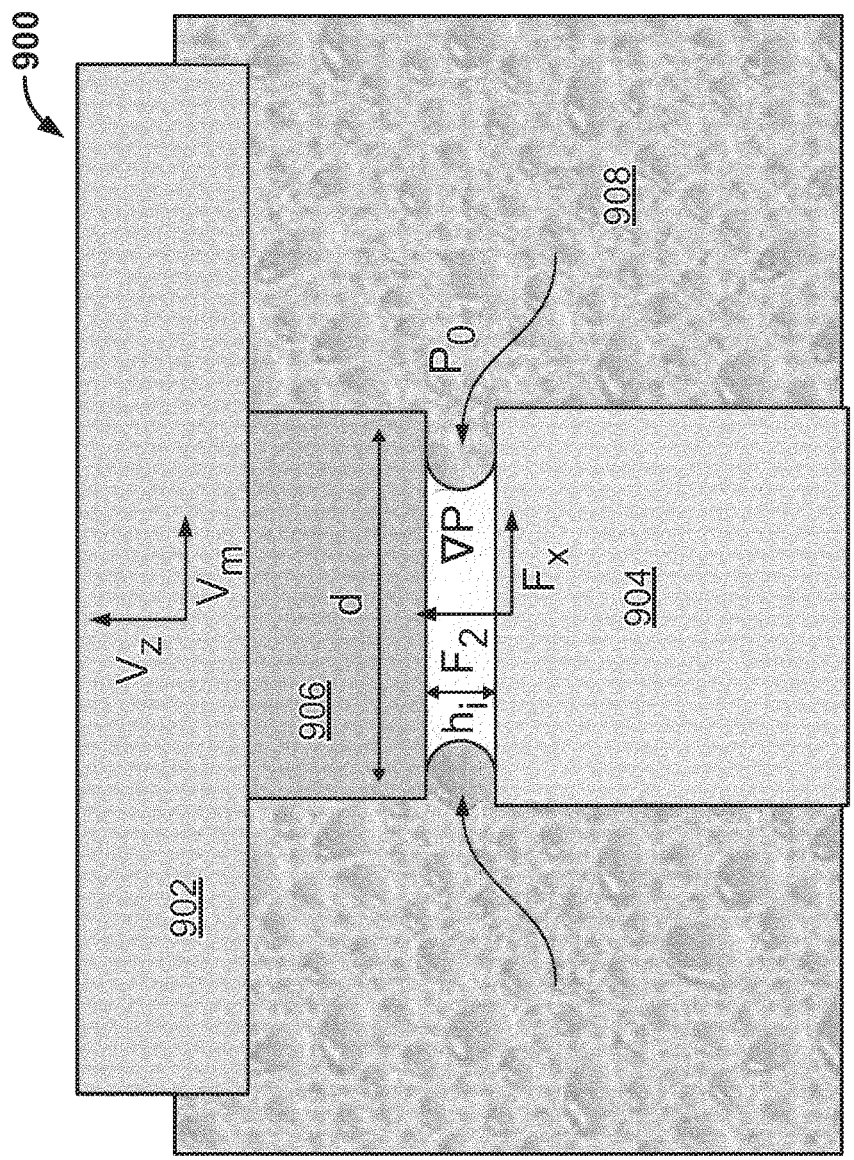
FIG. 9 is a schematic side view illustrating aspects of layer separation in a projection-based SL process using a sliding window screen.

FIG. 9 illustrates aspects of layer separation in a projection-based SL process apparatus 900 using a sliding window screen 904. After each light exposure, the newly cured material is accumulated between the previous cured layers 906 (shown attached to platform 902) and the window screen 904 in liquid resin 908. A separation of the layer 906 and window screen 904 is needed for the newly cured layers to be detached from the window screen and liquid resin 908 to recoat for building the next layer. Both the sliding motion in the X axis and the pulling up motion in the Z axis are incorporated such that the separation force and the fabrication time are largely reduced.

During the fabrication of a layer, the window screen moves from one side to another side along the X axis as diagramed in FIG. 9. After one light exposure, an inhibition zone $h_i$ (~2.5 microns for PDMS) exists between the window screen and the newly cured layers. Hence when the window screen is sliding in the X axis, the liquid resin in the inhibition zone will follow the movement. Thus, the sliding separation force Fx can be modeled as a friction between the material and the sliding window screen as:

$$F_x = \frac{\mu v_m}{h_i} \frac{W_e A}{W_e + W_r},$$

Where $\mu$ is the dynamic viscosity of material, $v_m$ is the window screen's speed, $h_i$ is the inhibition zone between the window screen and the newly cured part, A is the whole area, and a ratio of light exposure area to whole area is given by $$\frac{W_e}{W_e + W_r},$$

wherein $W_e$ is the light exposure area and $W_r$ is the non-exposure refilling area. Comparing with the force in conventional SL process $$F_x = \frac{\mu v_m}{h_i} A,$$

the sliding force in the present process is $$\frac{W_e}{W_e + W_r}$$

times smaller (usually smaller than 0.5).

When the platform moves in the Z axis for one layer thickness, it generates a pulling up separation force $F_z$. As shown in FIG. 9, the force is a suction force that drives the resin to flow into the gap between the window screen and the cured layers, which is determined as $$F_{our} \propto \frac{\mu v_z d^3 L}{h_i^3 N^2},$$

wherein $\mu$ is the liquid resin viscosity, $V_z$ is the moving speed, d is the width of the cured part, L is the length of the cured part, $h_i$ is the inhibition height, and N is the number of slots covered by the cured part. Compared with the separation force in the convention SL processes $$F_{conventional} \propto \frac{\mu v_z d^3 L}{h_i^3},$$

the pulling up force in the present process is much smaller, for example, about 50 times smaller when N=7 (about $N^2$ times smaller).

Separation Sequences: Layer separation in the present process has the following properties: 1) a sliding force is much smaller than a pulling up force, 2) the window screen largely reduces the pulling up force, which is in cubic relationship with part's diameter in the conventional SL processes. To make full use of these relationships, the separation sequence may be designed such that the separation method can combine the advantages of both sliding and pulling up separations.

Figure 10A:
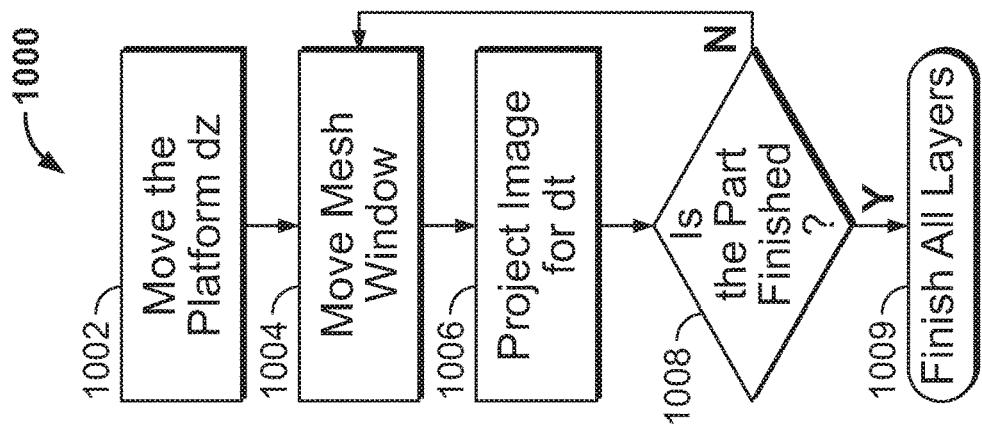
FIGS. 10A-D are flow charts each illustrating a different separation sequence in a projection-based SL process using a sliding window screen.
Figure 10C:
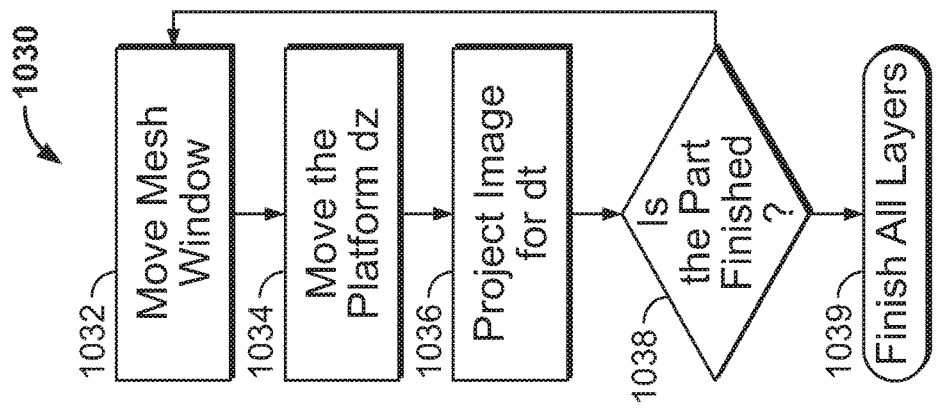
Figure 10D:
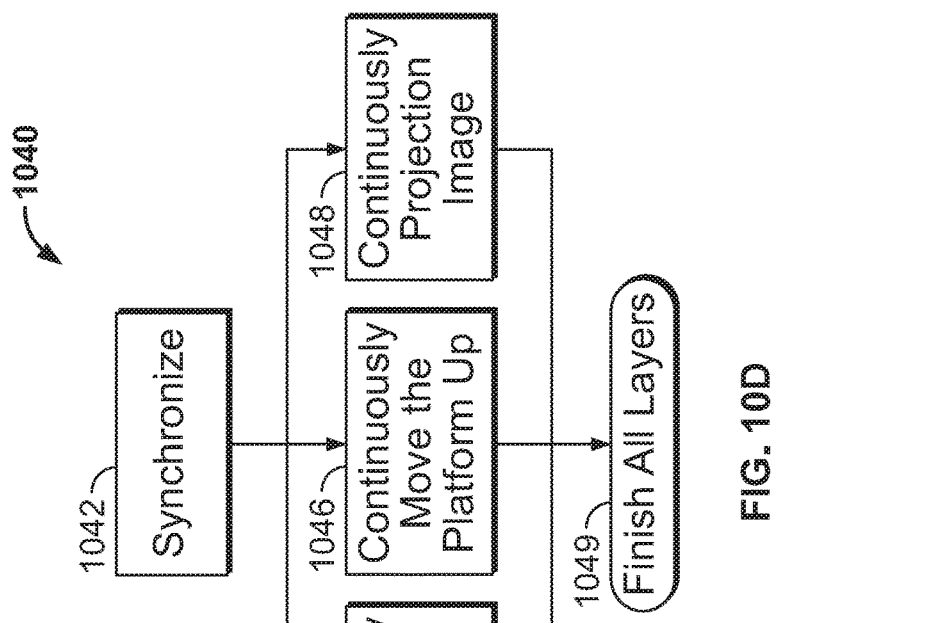
Figure 10B:
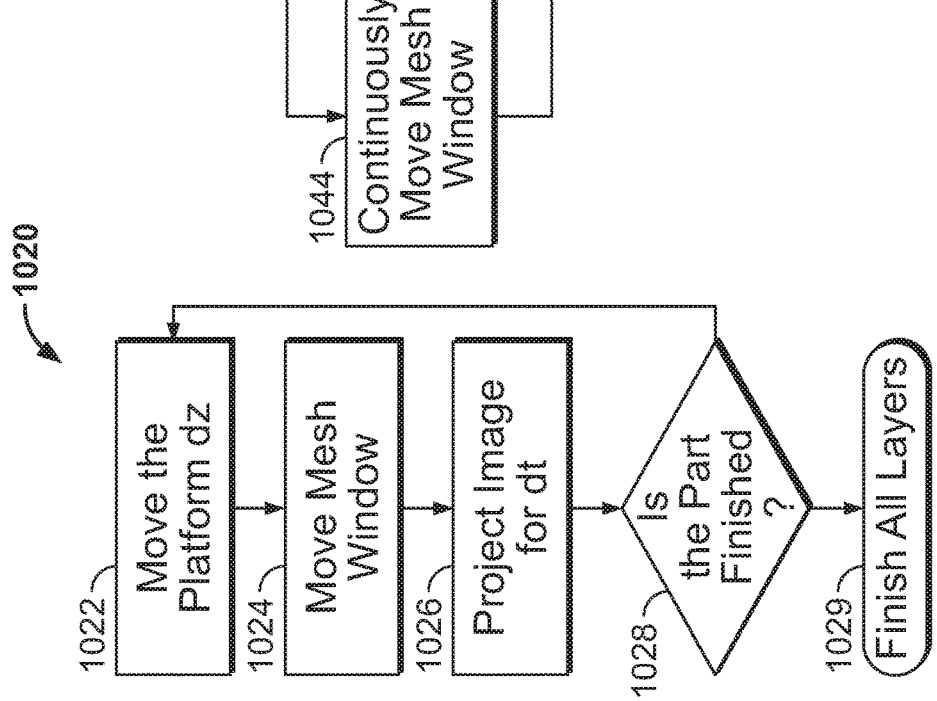

Coupled with the planned projecting images, the separation method can have several alternatives illustrated by FIGS. 10A-D. There are three basic controls in our process, i.e. projecting image, sliding window screen, and moving-up (or down) platform that carries cured layers. In our process, the sequence of these three steps may be organized in variously as shown in FIGS. 10A-D. FIGS. 10A-C show sequential configurations, while FIG. 10D shows a simultaneous configuration. For the sequential configurations, extra refilling time is required to refill the material, while the simultaneous configuration refills liquid resin together with light exposure, reducing or eliminating dedicated refilling time.

The sequence 1000 shown in FIG. 10A includes at 1002 moving the platform an increment dz in the Z direction, moving the mesh window 1004, projecting the mask image for a time increment dt 1006, testing for completion and repeating blocks 1004, 1006 as necessary 1008 until finishing all layers 1009. The sequence 1020 shown in FIG. 10B includes moving the platform an increment dz in the Z direction 1022, moving the mesh window 1024, projecting the mask image for a time increment dt 1026, testing for completion and repeating all prior blocks as necessary 1028 until finishing all layers 1029. The sequence 1030 shown in FIG. 10C includes moving the mesh window 1032, moving the platform an increment dz in the Z direction 1034, projecting the mask image for a time increment dt 1036, testing for completion and repeating all prior blocks as necessary 1038 until finishing all layers 1039. The simultaneous process 1040 shown in FIG. 10D includes synchronizing all operations 1042, performing the following operations contemporaneously (i.e., simultaneously) and continuously: moving the mesh window 1044, moving the platform in the Z direction 1046, and projecting the mask image 1048, until all layers are finished 1049.

Figure 11:
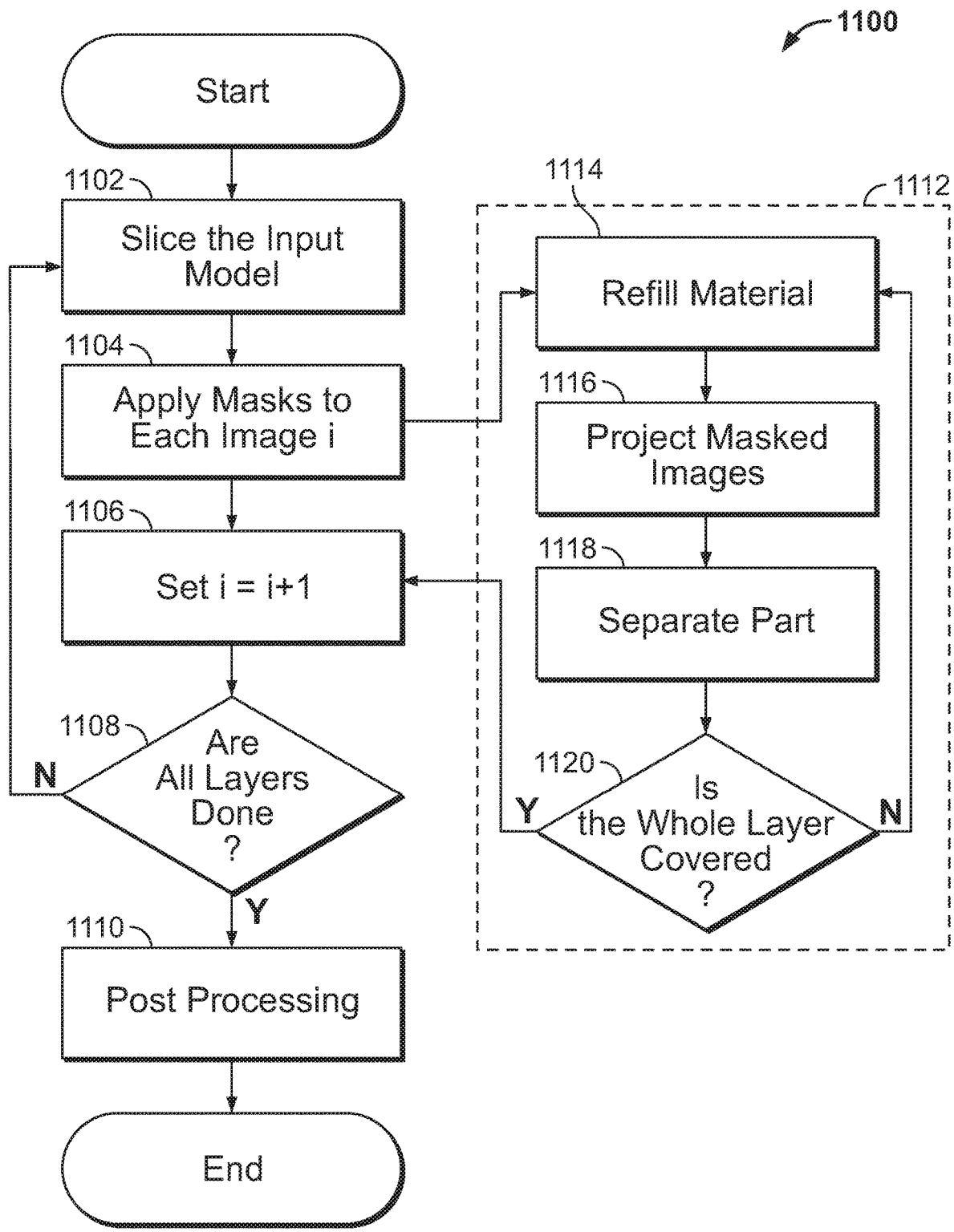
FIG. 11 is a flowchart illustrating aspect of a fabrication method for an article using a projection-based SL process with a sliding window screen.

System Control and Parameter Setting: Different from the conventional SL processes, the sliding of a window screen is incorporated in the fabrication of each layer in the present process. Given an input 3D model, the system follows the method 1100 as shown in FIG. 11 to fabricate a related 3D object. The input 3D model can be a standard STL file or in other formats. First, a computer program algorithmically slices 1102 the input 3D model into a sequence of mask images and applies the masks to each image 1104. Then the system forms a whole layer 1112, including refilling/sliding the window screen 1114 projecting the planned mask images 1116, separating the window screen from the formed layer 1118, and determining layer completion 1120. Then, the system moves up (or down) the platform 1106 until all the mask images have been exposed 1108. After the part has been fabricated, a post processing 1110 may be performed to remove supports and clean the fabricated part.

To improve the system performance, many parameters in the foregoing process should be controlled including parameters determining material photocuring and material refilling using the window screen. According to the curing characteristics (Jacobs, 1992), the exposure time for a given layer thickness should be set as $$t = \frac{E_c}{\phi} e^{\frac{-h}{\eta C_d}}$$

where Ec is the critical energy dose, $\phi$ is the light energy, h is the layer thickness, $\eta$ is the overlap ratio between layers, and $c_d$ is the light penetration depth. In order to maximize the fabrication speed in our process, the layer thickness should be set as $$h = \eta C_d.$$

Hence, the corresponding exposure time for the fastest speed is $$t = e^{-1} \frac{E_c}{\phi}.$$

In experimental results, a time 2 of 2.2 seconds for h=100 microns was found.

Window Screen Slot Size and Moving Speed: The material delivery slots in the window screen are designed such that the resin can quickly reach the center of the building area. The refilling flow rate in the slots is $$Q \propto \frac{PW_r^4}{\mu L}$$

assuming the slots are a tube with diameter $W_r$. In the extreme situation, the input 3D model is a solid block that can cover the whole window screen. In this limiting case, the fabrication speed $v_z$ is governed by $$v_z = \frac{Q}{LW_r} \propto \frac{PW_r^3}{\mu L^2}.$$

Thus, the slot size should be set according to the relation:

$$W_r \propto \left(\frac{v_z \mu L^2}{P}\right)^{1/3}.$$

In one experimental setup, the parameters were L=200 mm, $\mu$=180, $v_z$=16 µm/s, and d=6 mm.

Figure 12:
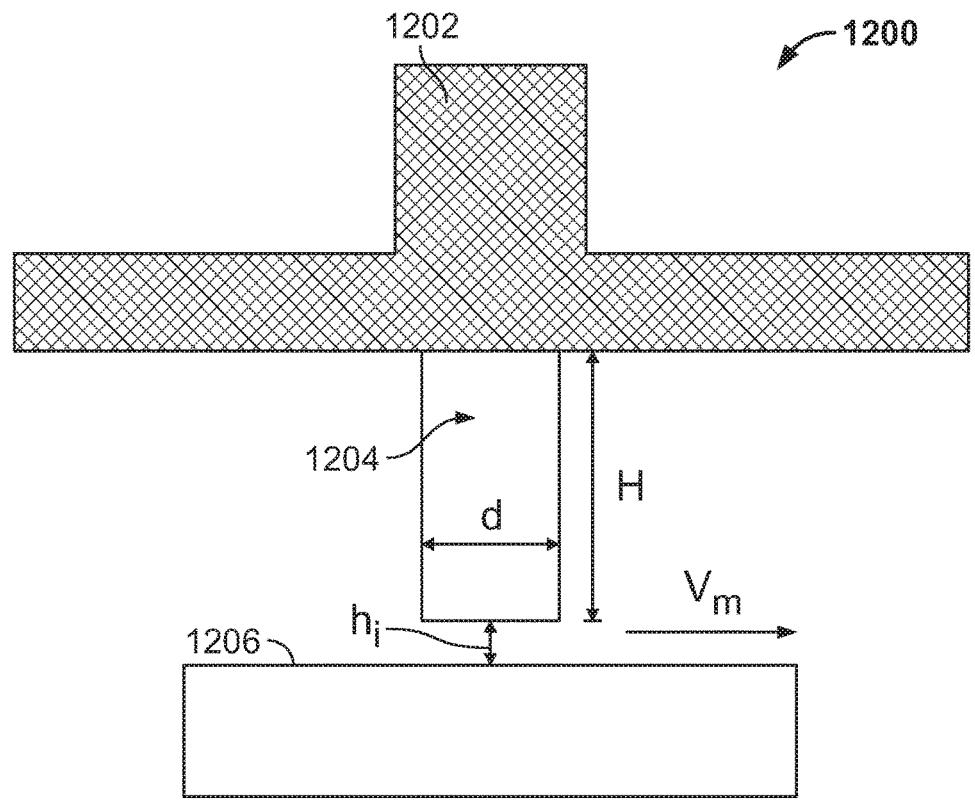
FIG. 12 is a side schematic view illustrating aspects of moving speed limitation in a projection-based SL process using a sliding window screen.

FIG. 12 shows how a small feature 1204 behaves when the window screen 1206 moves at speed v, relative to the platform 1202 in a system 1200. Assuming the shear stress of a printed part is σ, the moving speed of the window screen should be set within $$v_m \propto \frac{\sigma h_i d}{\mu H}$$

wherein $h_i$ is the inhibition gap, µ is the resin viscosity, H is the feature's height, σ is the cured part's shear stress, and d is the feature's diameter. In one experimental setup, the moving speed was set as $v_m$=5 to 15 mm/s.

Figure 13:
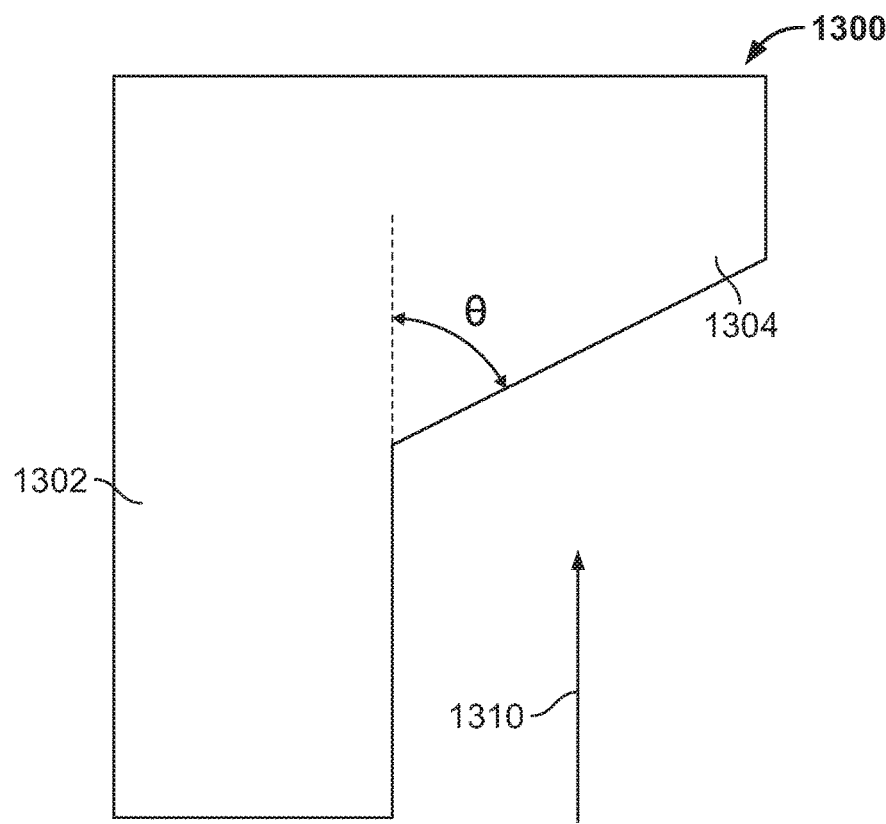
FIG. 13 is a geometric diagram illustrating the concept of hang-on angle in a projection-based SL process using a sliding window screen.

The foregoing methods and apparatus were tested using circular radial and parallel rectangular window screens. A cylinder of diameter 90 mm was fabricated at a rate of 25 µm/s using a parallel window screen. Using a window screen speed of 5 mm/s, it was possible to fabricate small features, as well. The XY resolution of the process is determined by the pixel size. The Z axial resolution is determined by the related Z stage, which could be 10-200 µm, using a parallel window screen. A solid freeform object (3D model of human teeth as arranged in jaw) was fabricated at a speed of 16 µm/s at a size of 50×70×15 mm, using a parallel window screen. A parallel window screen was used to make an arbitrary geometric shape, including a hang-on angle of around 85°. Generally, the process could directly fabricate hang-on structure within the hang-on angle range 0-85°, especially for features that are aligned along the sliding direction, FIG. 13 shows a diagram 1300 illustrating a hang-on angle in an overhanging portion 1304 of a feature 1302. The direction of platform movement is indicated by the vertical arrow 1310. A radial-patterned sliding window was also successfully used to fabricate a hemisphere with a rectangular hole.

Figure 14:
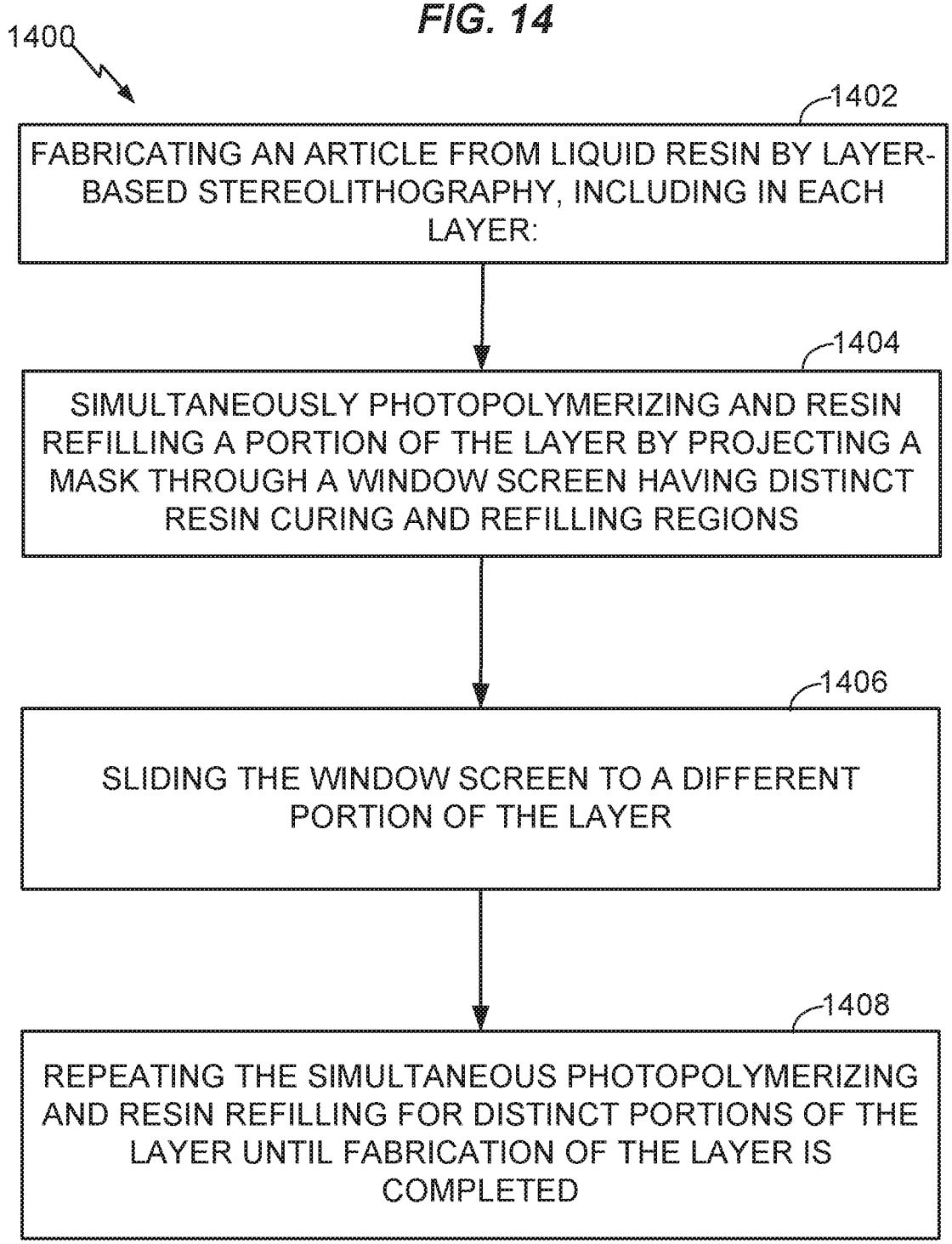
FIG. 14 is a flow diagram illustrating further aspects of a projection-based SL process using a sliding window screen.

In summary of and consistent with the foregoing, FIG. 14 illustrates further aspects of a projection-based SL method 1400 using a sliding window screen. The method 1400 for stereolithography for additive manufacturing using a sliding window screen may include, at 1402, fabricating an article from liquid resin by layer-based stereolithography, including performing certain operations in forming each layer. The certain operations may include, at 1404 simultaneously photopolymerizing and resin refilling a portion of the layer by projecting a mask through a window screen having distinct resin curing and refilling regions, at 1406 sliding the window screen to a different portion of the layer; and at 1408 repeating the simultaneous photopolymerizing and resin refilling for distinct portions of the layer until fabrication of the layer is completed.

The method may further include determining one or more projection masks for each layer based in part on a pattern in which the distinct resin curing and refilling regions of the sliding window are arranged. In an aspect, for example, the distinct resin curing and refilling regions of the window screen are arranged in a pattern selected from: parallel, gridded, radial, or branched. In another aspect, the projection mask may be configured with black pixels correlated to all refilling regions of the window screen, and light emitting pixels correlated one or more resin curing regions of the window screen. In some embodiments, the window screen is opaque in the refilling regions. In others, the resin refilling regions are transparent. The method may include determining one or more projection masks for each layer based in part on whether the window screen is opaque in the refilling regions. In an aspect, the repeating step is performed only once for each layer.

The method may further include, for example, setting a layer thickness based on the relation $h=\eta Cd$, wherein h is the layer thickness, $\eta$ is an overlap ratio between layers, and Cd is a light penetration depth. Setting other parameters may be performed as described in the detailed description above.

The method may include separating the window screen from the portion of the layer at least in part by exerting a separation force in a direction perpendicular to a plane of sliding motion of the window screen. The method may include other operations and aspects, as described in the detailed description above.

Figure 15:
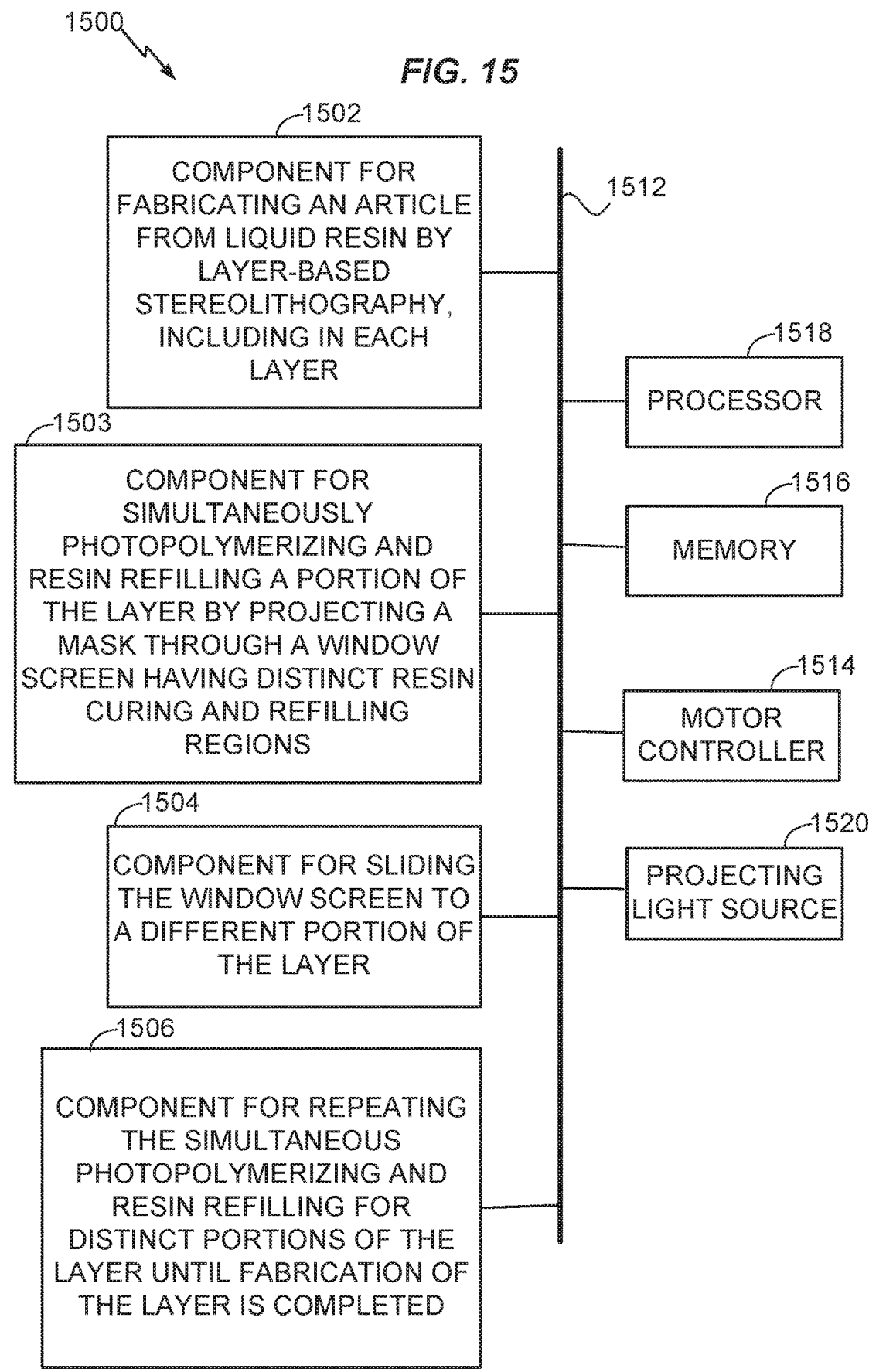
FIG. 15 is a block diagram illustrating aspects of an apparatus for performing a process as shown in FIG. 14.

Consistent with method 1400 and other disclosures above, and as further illustrated by FIG. 15, an apparatus 1500 may function as an improved apparatus for additive manufacturing by stereolithography. The apparatus 1500 may comprise an electronic component or module 1502 for fabricating an article from liquid resin by layer-based stereolithography, including performing certain operations in forming each layer. The component 1502 may be, or may include, a means for said fabricating. Said means may comprise an algorithm executable by the processor to cause the apparatus 1500 to perform the fabricating function, for example, as described herein above in connection with FIG. 11 and elsewhere.

The apparatus 1500 may comprise an electronic component or module 1503 for simultaneously photopolymerizing and resin refilling a portion of the layer by projecting a mask through a window screen having distinct resin curing and refilling regions. The component 1503 may be, or may include, a means for said simultaneously photopolymerizing and resin refilling. Said means may comprise a window screen as described herein, in conjunction with an algorithm executable by the processor to cause the apparatus 1500 to perform the function of simultaneously photopolymerizing and resin refilling, with projection of a mask image. For example, the algorithm may include selecting a mask image based on the part geometry slice corresponding to the layer and configuration of window screen, and controlling a projector so that the mask image is projected through the window screen, excluding the resin refilling areas.

The apparatus 1500 may comprise an electronic component or module 1504 for sliding or otherwise repositioning the window screen to a different portion of the layer. The component 1504 may be, or may include, a means for said sliding or repositioning. Said means may comprise an algorithm executable by the processor to cause the apparatus 1500 to perform the sliding function, for example, selecting parameters for motor control based on conditions of the SL process as described above, separating the window screen from the cured portion of the layer, and moving the window screen to that its resin curing region aligns with a portion of the layer that remains to be cured.

In addition, the apparatus 1500 may comprise an electronic component or module 1506 for repeating the simultaneous photopolymerizing and resin refilling for distinct portions of the layer until fabrication of the layer is completed. The component 1506 may be, or may include, a means for said repeating. Said means may comprise an algorithm executable by the processor to cause the apparatus 1500 to perform the repeating function, for example, any one of the algorithms diagramed in FIGS. 10A-D herein above.

The apparatus 1500 may include a processor module 1518 having at least one processor; in the case of the apparatus 1500 this may be configured as a special purpose controller, rather than as a general purpose microprocessor. The processor 1518, in such case, may be in operative communication with the modules 1502-1506 via a bus 1512 or similar communication coupling. The processor 1518 may effect initiation and scheduling of the processes or functions performed by electrical components 1502-1506.

In related aspects, the apparatus 1500 may include a motor controller module 1514 through under higher level control of the processor 1518 that controls Z axis motion of the platform and X or Y axis movement of the window screen. In addition, the apparatus may include a projecting light source 1520 under control of the processor 1518. The projecting light source may operate by processor control in the manner described herein above to cause the resin curing regions of the window screen to perform curing, while preventing curing in the resin refilling regions. In further related aspects, the apparatus 1500 may include a module for storing data and executable instructions, such as, for example, a memory device/module 1516. The computer readable medium or the memory module 1516 may be operatively coupled to the other components of the apparatus 1500 via the bus 1512 or the like. The memory module 1516 may be adapted to store computer readable instructions and data for effecting the processes and behavior of the modules 1502-1506, and subcomponents thereof, or the processor 1518, or the methods disclosed herein, and other operations for content identification, playing, copying, and other use. The memory module 1516 may retain instructions for executing functions associated with the modules 1502-1508. While shown as being external to the memory 1516, it is to be understood that the modules 1502-1506 may exist at least partly within the memory 1516.

As used in this application, the terms "component" and "module" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, microphone inputs, and/or mouse-and-keyboard type interfaces. Examples of such devices include computers (desktop and mobile), smart phones, personal digital assistants (PDAs), voice-activated terminals and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

Having thus described a preferred embodiment of an apparatus, system and method for projection-based SL using a sliding window screen, it should be apparent to those skilled in the art that certain advantages of the within system have been achieved. The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. For example, a method and system using particular window screen patterns has been described, but it should be apparent that the novel concepts described above may be applied by one of ordinary skill to other window screen patterns without departing from the novel teachings of the disclosure.

The invention claimed is:

1. A method for projection-based stereolithography, comprising:
    fabricating an article from liquid resin by layer-based stereolithography with a window screen configured with an integrated tank to enable simultaneous photopolymerizing and resin filling steps comprising at least resin filling and sliding the window screen while projecting a projection mask for photopolymerizing, including in each layer:
    simultaneously photopolymerizing a first portion of the layer and resin filling a second portion of the layer by projecting a mask through the window screen having distinct (i) light transmissive resin curing portions and (ii) filling portions,
    wherein the light transmissive resin curing portions are interspersed with the filling portions arranged in a grid separated by sidewalls and all surrounded by surrounding walls;
    sliding the window screen so that the first portion of the layer is aligned for resin filling and the second portion of the layer is exposed for photopolymerizing;
    simultaneously photopolymerizing the second portion of the layer and resin filling the first portion of the layer; and
    repeating the simultaneous photopolymerizing and resin filling steps until fabrication of the layer is completed.

2. The method of claim 1, wherein the first portion of the layer is adjacent to the second portion of the layer.

3. A method for projection-based stereolithography, comprising:
    fabricating an article from liquid resin by layer-based stereolithography with a window screen configured with an integrated tank to enable simultaneous photopolymerizing and resin filling/refilling steps comprising at least resin filling/refilling and sliding the window screen while projecting a projection mask for photopolymerizing, including in each layer:
    simultaneously photopolymerizing a first portion of the layer and resin filling/refilling a second portion of the layer by projecting a mask through the window screen having distinct (i) light transmissive resin curing portions and (ii) filling/refilling portions,
    wherein the light transmissive resin curing portions are interspersed with the filling/refilling portions arranged in a grid separated by sidewalls and all surrounded by surrounding walls; and sliding the window screen so that the first portion of the layer is aligned for resin filling/refilling and the second portion of the layer is exposed for photopolymerizing.

4. The method of claim 3, further comprising:

simultaneously photopolymerizing the second portion of the layer and resin filling/refilling the first portion of the layer; and repeating the simultaneous photopolymerizing and resin filling/refilling steps until fabrication of the layer is completed.

5. The method of claim 4, wherein the first portion of the layer is adjacent to the second portion of the layer.

6. The method of claim 4, further comprising determining one or more additional projection masks for each layer based in part on a pattern in which a distinct resin curing and refilling regions of a sliding window are arranged.

7. The method of claim 6, wherein the distinct resin curing and refilling regions of the window screen are arranged in a pattern selected from: parallel, gridded, radial, or branched.

8. The method of claim 4, further comprising setting a layer thickness based on a relation $h=\eta C_d$, wherein his the layer thickness, $\eta$ is an overlap ratio between layers, and $C_d$ is a light penetration depth.

9. The method of claim 4, further comprising separating the window screen from the first portion or the second portion of the layer at least in part by exerting a separation force in a direction perpendicular to a plane of sliding motion of the window screen.

10. The method of claim 4, wherein the repeating step is performed only once for each layer.

11. The method of claim 7, wherein operative areas of the distinct resin curing and refilling regions of the window screen are equal in area.

* * * * *